April 8, 1952     D. R. MEIER     2,592,309
FLEXIBLE COUPLING
Filed Oct. 5, 1949
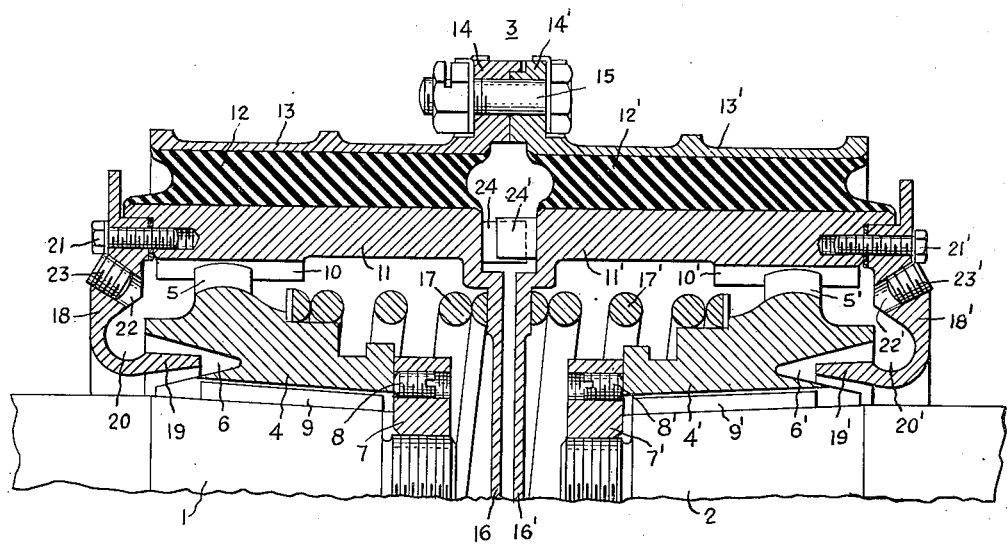
Inventor:
Donald R. Meier,
by *Ernest F. Britton*
His Attorney.

Patented Apr. 8, 1952

2,592,309

UNITED STATES PATENT OFFICE 2,592,309

FLEXIBLE COUPLING

Donald R. Meier, Erie, Pa., assignor to General Electric Company, a corporation of New York Application October 5, 1949, Serial No. 119,686

2 Claims. (Cl. 64—9)

My invention relates to couplings and, more particularly, to flexible couplings for the transmission of power between two rotary shafts.

When a conventional coupling is used to transmit torque between a single-phase alternating current motor and a driven shaft, pulsations resulting from the reversals of current in the motor windings are transmitted through the coupling and set up undesirable vibrations in the driven shaft and in the structure which supports the driven shaft. If the supporting structure is a vehicle, such as a railway car, this vibration may become extremely annoying to passengers because of its tendency to cause windows, doors and seats to rattle continuously. Heretofore spring gears have been incorporated in the transmission device in an effort to damp out the pulsations in the torque transmitted through the coupling.

An object of this invention is the provision of a simpler, more effective and less expensive device for minimizing these undesirable vibrations.

Another object of my invention is to provide a flexible coupling for low vibration transmission of torque from an alternating current motor.

A further object of my invention is the provision of a coupling having a yielding connection between two shafts which cushions the driving torque, absorbs vibration from the driving shaft, permits normal flexing without distortion of or injury to the coupling and prolongs its life and efficient working qualities.

Further objects and advantages of my invention will become apparent as the description proceeds, and the features of novelty will be pointed out with particularity in the claims forming part of this specification.

For a better understanding of my invention reference is directed to the accompanying drawing the single figure of which is a partial cross-sectional view of one embodiment of my invention.

Briefly, the coupling disclosed consists of two similar parts mounted upon the ends of shafts comprising outer sleeve members upon which are formed corresponding flanges for rigidly bolting the sleeves together, inner sleeve members enclosed within the outer sleeves and geared hubs mounted upon the shafts within the inner sleeves. Internal teeth on the inner sleeves mesh with teeth on the hubs. Cylindrical layers of elastic material such as rubber or neoprene fill the voids between the inner and the outer sleeves and are bonded to the adjacent surfaces of each to transmit torque therebetween. In addition to absorbing the pulsations of the alternating current motor armature, the elastic layer acts as a shock absorber to minimize the jolts due to the sudden application of power, protecting the coupling and the motor armature. The inner sleeves are provided with integral plates oil sealing the ends of the shafts. A plate retainer ring seals in lubricant at the opposite ends of each of the inner sleeves. Springs mounted between the integral plates and the hubs position the inner sleeves with respect to the hubs.

The inner sleeves are provided with interspaced lugs around the abutting ends of the inner sleeves which do not mesh under normal conditions but are provided as a fail-safe expedient in case of failure of the bond between the surfaces of the elastic material and any of the four sleeves.

Referring to the single figure of the drawing, torque from a driving shaft 1 is transmitted to a driven shaft 2 by a coupling 3. In coupling 3 duplicate hubs 4 and 4' are mounted on the adjacent ends of shafts 1 and 2. Hubs 4 and 4' are provided with spherical gear teeth 5 and 5' on their peripheries and are provided on their outer ends with circumferential wells 6 and 6' having a V-shaped cross-section. The hubs are held in place by nuts 7 and 7' and set screws 8 and 8'. Keys 9 and 9' transmit torque between shafts 1 and 2 and hubs 4 and 4'. Teeth 5 and 5' mesh with teeth 10 and 10' to transmit torque between hubs 4 and 4' and inner sleeves 11 and 11'. Intermediate elastic cylinders 12 and 12' of rubber, neoprene or the like are molded and bonded between the adjacent surfaces of inner sleeves 11 and 11' and outer sleeves 13 and 13' to transmit torque therebetween. The process of moulding and bonding is carried on by a contractor and the bonding material used is not known to me.

Outer sleeves 13 and 13' are provided at their abutting ends with peripheral flanges 14 and 14' respectively which are secured together by suitable fastening ends such as bolts 15.

Adjacent ends of sleeves 11 and 11' are completely enclosed by plate portions 16 and 16' integral therewith to keep lubricant from elastic cylinders 12 and 12'. Springs 17 and 17' maintain sleeves 11 and 11' in position with respect to hubs 4 and 4'. Circular cover plates 18 and 18' have center extensions 19 and 19' which surround shafts 1 and 2 and extend into wells 6 and 6'. Annular ring chambers 20 and 20' are formed at the bases of extensions 19 and 19'. Bolts 21 and 21' secure plates 18 and 18' to inner sleeves 11 and 11'.

Cover plates 18 and 18' are provided respectively with threaded orifices 22 and 22' and corresponding plugs 23 and 23' through which lubricant is supplied to the gears. When the coupling is at rest, grease from the gears drains down and is retained in annular chambers 20 and 20'. Interspaced lugs 24 and 24' mounted upon the abutting faces of inner sleeves 11 and 11' do not mesh during ordinary operation but provide a fail safe device to transmit torque in case the bond between any of the elastic surfaces and the adjoining metal should fail.

To assemble this device, cover plates 18 and 18' are assembled loosely on the shafts 1 and 2. Hubs 4 and 4' are placed on the shafts over keys 9 and 9', nuts 7 and 7' are screwed on the shafts, set screws 8 and 8' are tightened and the shafts are placed in their respective operating positions. The hub ends of the shafts are then offset so that their longitudinal axes are at angles with the axes of their bearings. With the shafts in this position, springs 17 and 17' and corresponding halves of the remainder of the coupling are placed on their shafts, after which the shafts are returned to the operating positions. Bolts 15 are tightened in place and cover plates 18 and 18' are secured to cylinders 11 and 11' by bolts 21 and 21'.

Spherical teeth 5 make it possible to tolerate a small misalignment of the two shafts. This type of tooth permits a parallel misalignment of as much as 5° between the two shafts. An angular misalignment of 5° may be tolerated on each shaft, making a total permissible misalignment angularly of 10°.

The bond between the surfaces of the elastic material and the surfaces of the inner and outer sleeves is sufficient to transmit the torque between the sleeves since the areas in contact are large as compared to the torque transmitted so that the shearing force per unit area acting to separate the bonded surfaces is low in value.

A single phase A.-C. motor creates a torque which varies sinusoidally from a value of zero to a maximum torque of 200% of average torque. Thus, the pulsation torque created in the windings and transmitted to the driving shaft equals the average torque. Depending upon the mechanical characteristics of the coupling, the electrical torque created by the motor may be transmitted to the driven shaft with magnified or diminished pulsation depending upon coupling stiffness, moments of inertia etc. Calculations and tests indicate that the coupling incorporating my invention reduces the pulsation torque transmitted to the driven shaft to 10% of the average torque. The cost of a flexible coupling made according to this invention is about one-sixth that of a spring gear.

A further advantage in the use of a coupling built according to my invention is its capability of absorbing sudden surges of power from the motor that might otherwise damage the power transmission units.

While I have shown and described a preferred embodiment of my invention, it will be understood that my invention may well take other forms and I, therefore, aim in the appended claims to cover all such changes and modifications as fall within the true spirit and scope of the invention.

What I claim as new and desire to secure by Letters Patent of the United States is:

1. A flexible coupling for transmitting torque between substantially aligned driving and driven shafts comprising internal cylindrical members provided with internal gear teeth and having integral end plates enclosing the adjacent ends of said shafts, hub members adapted to be splined to said shafts within said internal members and provided with peripheral teeth meshing with said internal teeth to transmit torque between said shafts and said internal members, external cylindrical members enclosing said internal members and provided with corresponding adjacent peripheral flanges, fastening means securing together pairs of said flanges, cylindrical members of elastic material filling the spaces between said inner and outer members and having inner and outer surfaces bonded to adjacent surfaces of said members to transmit torque therebetween, interspaced lugs mounted upon the adjacent end surfaces of said inner cylindrical members for fail-safe transmission of torque therebetween, circular end plates mounted upon said inner members and adapted to surround said shaft to retain grease for said teeth therein, and spring means mounted between said end plates and said hubs thereby to position said inner cylindrical members.

2. A flexible coupling for transmitting torque between a pair of adjacent substantially aligned driving and driven shafts comprising similar hubs adapted to be mounted upon adjacent ends of said shafts and having external teeth, lock nuts and setscrews for securing said hubs to said shafts, a pair of inner cylindrical members mounted in end to end relationship surrounding said hub members and provided with internal gear teeth meshing with said external teeth to transmit torque therebetween, said cylindrical members having integral end plates adapted to enclose the adjacent ends of said shafts and having interspaced lugs mounted upon the adjacent faces thereof, outer cylindrical members mounted in end to end relationship surrounding said inner members and having abutting peripheral flanges, fastening means securing said flanges together to provide for the transmission of torque therebetween, cylinders of elastic material moulded between said inner and outer sleeves and bonded to the adjacent surfaces thereof to transmit torque and absorb vibration therebetween, circular cover plates mounted on said inner members and having central projections extending around said shafts and within said end wells, said plates having means for admission of lubricant to said gears, annular grooves being formed at the bases of said projections to retain said lubricant therein, and springs mounted between said hubs and said inner sleeves to maintain the relative positions therebetween.

DONALD R. MEIER.

REFERENCES CITED

The following references are of record in the file of this patent:

UNITED STATES PATENTS

| Number | Name | Date |
|---|---|---|
| Re. 15,177 | Fast | Aug. 16, 1921 |
| Re. 21,843 | Smith et al. | June 24, 1941 |
| 2,174,223 | Frauenthal et al. | Sept. 26, 1939 |
| 2,251,804 | Reuter et al. | Aug. 5, 1941 |

FOREIGN PATENTS

| Number | Country | Date |
|---|---|---|
| 30,873 | Holland | Sept. 15, 1933 |